(12) United States Patent
Homsky et al.

(10) Patent No.: US 10,859,663 B2
(45) Date of Patent: Dec. 8, 2020

(54) BEACON-BASED POSITION AWARENESS SYSTEM

(71) Applicant: POINTME LTD., Tel Aviv (IL)

(72) Inventors: Shai Homsky, Tel Aviv (IL); Ran Soffer, Tel Mond (IL)

(73) Assignee: POINTME LTD., Tel Aviv (IL)

( * ) Notice: Subject to any disclaimer, the term of this patent is extended or adjusted under 35 U.S.C. 154(b) by 0 days.

(21) Appl. No.: 16/609,474

(22) PCT Filed: Apr. 30, 2018

(86) PCT No.: PCT/IL2018/050476
§ 371 (c)(1),
(2) Date: Oct. 30, 2019

(87) PCT Pub. No.: WO2018/203332
PCT Pub. Date: Nov. 8, 2018

(65) Prior Publication Data
US 2020/0200851 A1     Jun. 25, 2020

Related U.S. Application Data

(60) Provisional application No. 62/613,075, filed on Jan. 3, 2018, provisional application No. 62/492,191, filed on Apr. 30, 2017.

(51) Int. Cl.
*H04W 24/00*     (2009.01)
*G01S 1/14*     (2006.01)
(Continued)

(52) U.S. Cl.
CPC .............. *G01S 1/14* (2013.01); *G01S 1/0428* (2019.08); *H01Q 3/30* (2013.01); *H04B 17/318* (2015.01);
(Continued)

(58) Field of Classification Search
CPC .... G01S 1/14; H04B 17/318; H04M 1/72519; H01M 1/72522; H04W 8/245; H01O 3/30
(Continued)

(56) References Cited

U.S. PATENT DOCUMENTS 8,111,141 B1 *   2/2012   Brand .................. H04B 5/0056
                                                                 340/10.5
9,857,162 B1     1/2018   Gum et al.
(Continued)

FOREIGN PATENT DOCUMENTS

EP          2278352 A2    7/2014
WO     2007023446 A1    3/2007
(Continued)

*Primary Examiner* — Danh C Le
(74) *Attorney, Agent, or Firm* — The Roy Gross Law Firm, LLC; Roy Gross

(57) ABSTRACT

A system comprising: a transmitting device configured to transmit, in at least one plane, a plurality of directional signals each covering an angular sector, wherein every adjacent pair of said angular sectors overlaps partially to create a logical sector, and wherein each of said plurality of directional signals encodes at least an indication regarding each said logical sector associated therewith; and a client device comprising program instructions executable by at least one hardware processor to: cause the client device to receive at least some of said plurality of directional signals, calculate a signal strength level (RSL) value for each of said received directional signals, and determine that said client device is located within a said logical sector, when two highest said RSL values (i) are related to two said directional signals associated with said logical sector, and (ii) are within a specified value range of each other.

17 Claims, 15 Drawing Sheets

(51) Int. Cl.
*H04B 17/318* (2015.01)
*G01S 1/04* (2006.01)
*H01Q 3/30* (2006.01)
*H04M 1/725* (2006.01)
*H04W 88/02* (2009.01)

(52) U.S. Cl.
CPC .... *H04M 1/72519* (2013.01); *H04M 1/72522* (2013.01); *H04W 88/02* (2013.01)

(58) Field of Classification Search
USPC .................. 455/456.1, 456.6, 550.1, 418
See application file for complete search history.

(56) References Cited

U.S. PATENT DOCUMENTS

| | | | |
|---|---|---|---|
| 10,429,485 B1* | 10/2019 | Kapre | G01S 3/043 |
| 2009/0312037 A1* | 12/2009 | Jo | G01S 5/08 |
| | | | 455/456.2 |
| 2010/0130230 A1 | 5/2010 | Aggarwal et al. | |
| 2010/0238682 A1* | 9/2010 | Carpenter | A42B 3/044 |
| | | | 362/555 |
| 2013/0005349 A1* | 1/2013 | Sanders | G01S 5/12 |
| | | | 455/456.1 |
| 2013/0026224 A1 | 1/2013 | Ganick et al. | |
| 2013/0028246 A1 | 1/2013 | Gonikberg | |
| 2013/0038487 A1* | 2/2013 | Carey | G01S 3/325 |
| | | | 342/427 |
| 2014/0011513 A1* | 1/2014 | Watts | H04W 64/00 |
| | | | 455/452.2 |
| 2014/0018111 A1 | 1/2014 | Farley et al. | |
| 2014/0236476 A1 | 8/2014 | Khorashadi et al. | |
| 2014/0375982 A1 | 12/2014 | Jovicic et al. | |
| 2015/0005011 A1 | 1/2015 | Nehrenz et al. | |
| 2015/0147067 A1 | 5/2015 | Ryan et al. | |
| 2015/0377609 A1 | 12/2015 | Shen et al. | |
| 2016/0245638 A1 | 8/2016 | Sheinker et al. | |
| 2016/0330584 A1 | 11/2016 | Akpinar et al. | |
| 2016/0341811 A1 | 11/2016 | Langlois | |
| 2017/0026794 A1* | 1/2017 | Baker | H04L 5/0048 |
| 2017/0188327 A1 | 6/2017 | Shvodian | |
| 2017/0248696 A1 | 8/2017 | Vyssotski et al. | |
| 2017/0337813 A1* | 11/2017 | Taylor | G05D 1/0287 |
| 2018/0041985 A1 | 2/2018 | Davaadorj et al. | |
| 2018/0217248 A1* | 8/2018 | Nakayama | G01S 7/415 |

FOREIGN PATENT DOCUMENTS

| | | |
|---|---|---|
| WO | 2015189161 A1 | 12/2015 |
| WO | 2017050695 A1 | 3/2017 |

* cited by examiner

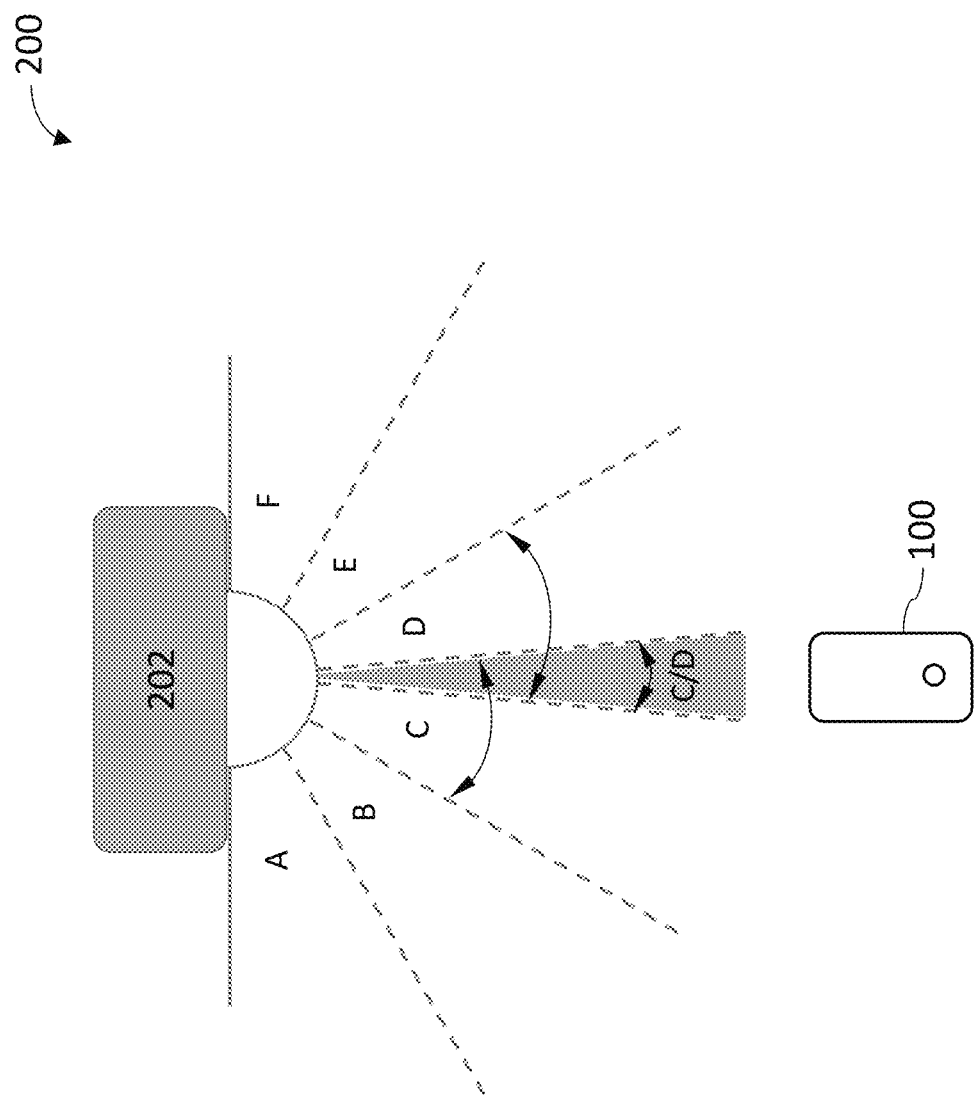

BEACON-BASED POSITION AWARENESS SYSTEM

CROSS-REFERENCE TO RELATED APPLICATIONS

This application is a National Phase of PCT Patent Application No. PCT/IL2018/050476 having International filing date of Apr. 30, 2018, which claims priority to U.S. Provisional Patent Application No. 62/492,191, filed Apr. 30, 2017 titled "POINT OF SIGHT ASSOCIATION (POSA)—NEW INNOVATIVE POINTING FUSION SENSOR THAT ENABLES MOBILE DEVICES TO CONNECT TO SMART ELEMENTS SIMPLY BY POINTING AT THEM", and U.S. Provisional Patent Application No. 62/613,075, filed Jan. 3, 2018 titled "LOGICAL BEAMS", the contents of which are incorporated herein by reference in their entirety.

FIELD OF THE INVENTION

The invention relates to the field of beacon-based systems for position and orientation awareness of mobile devices.

BACKGROUND

Wireless beacons transmit data packets of fixed length and format, and including specified information. The information transmitted by one or more beacons can be received by a compatible receiving device, such as a smartphone or tablet, and used to determine proximity and/or orientation of the receiving device relative to the beacons. For example, by placing beacons in particular fixed locations indoors or outdoors, real-time position awareness can be provided to receiving devices, independently of other systems such as the Global Positioning Systems (GPS).

Software executing on the receiving device can further be configured to process information from beacons to perform predetermined actions upon detecting specified proximity and/or orientation relative to particular beacons. For example, by implementing appropriate logic in the software executing on the receiving device, or on another computer coupled to the receiving device via a suitable network, beacons can be used to enable a wide variety of location-based applications. These applications include indoor mapping and way-finding systems, as well as consumer-content and notification applications.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising: a transmitting device configured to transmit, in at least one plane, a plurality of directional signals each covering an angular sector, wherein every adjacent pair of said angular sectors overlaps partially to create a logical sector, and wherein each of said plurality of directional signals encodes at least an indication regarding each said logical sector associated therewith; and a client device comprising at least one hardware processor and a non-transitory computer-readable storage medium having stored thereon program instructions, the program instructions executable by the at least one hardware processor to: cause the client device to receive at least some of said plurality of directional signals, calculate a signal strength level (RSL) value for each of said received directional signals, and determine that said client device is located within a said logical sector, when two highest said RSL values (i) are related to two said directional signals associated with said logical sector, and (ii) are within a specified value range of each other.

In some embodiment, the at least one plane comprises one or more of a horizontal plane and a vertical plane.

In some embodiment, the client device is configured to determine at least some of a location, an altitude, a velocity, an acceleration, an orientation, and/or an azimuth relative to a reference azimuth, of said client device.

In some embodiment, the client device is further configured to calculate a location of said client device based, at least in part, on (i) said determination, and (ii) a calculation of a distance from said transmitting device based on said two highest said RSL values.

In some embodiment, the transmitting device comprises a phased array antenna configured to transmit said plurality of directional signals.

In some embodiment, the system comprises two or more said transmitting devices, wherein said determination comprises determining that said client device is located within at least two intersecting said logical sectors, wherein each of said intersecting logical sectors is transmitted by a different one of said transmitting devices.

In some embodiment, the client device is further configured to calculate a location of said client device based, at least in part, on (i) said determination, and (ii) a calculation of a distance from each of said transmitting devices, based on said two highest said RSL values associated with each of said transmitting device.

In some embodiment, each of said angular sectors has an angle of between 5 and 60 degrees, and each of said logical sectors has an angle of between 2.5 degrees and 30 degrees.

In some embodiment, the specified range is between 0 and 6 dBm.

In some embodiment, the client device is further configured to determine that it is located at a midpoint between a said logical sector and a first said angular sector of a said adjacent pair creating said logical sector, when one of said two highest said RSL values corresponding to a second said angular sector of said adjacent pair corresponds to a location of said client device outside said second angular sector.

In some embodiment, each of said directional signals further encodes information selected from the group consisting of: identification of said transmitting device, identification of said directional signal, an azimuthal direction data regarding said angular sector of said directional signal relative to a reference azimuth, a Uniform Resource Locator (URL); and information regarding one or more of: a location, an altitude, a velocity, an acceleration, and a spatial orientation of said transmitting device.

In some embodiment, the client device is further configured to determine a pointing orientation of said client device relative to said transmitting device, by: calculating, by said client device, a back-azimuth of said client device relative to said reference azimuth; and determining, by said client device, whether said back-azimuth of said client device is within any of (i) said angular sectors or (ii) said logical sectors.

In some embodiment, the transmitting device is configured to transmit said plurality of directional signals using at least one wireless protocol selected from the group consisting of: Bluetooth, Bluetooth Low-Energy (BLE), and wireless local area network (WLAN).

There is also provided, in accordance with an embodiment, a system comprising: a transmitting device configured to transmit at least one directional signal covering an angular sector, said directional signal comprising data regarding at least: an identifier for said directional signal, and an azimuthal direction of said angular sector relative to a reference azimuth; and a client device comprising at least one hardware processor and a non-transitory computer-readable storage medium having stored thereon program instructions, the program instructions executable by the at least one hardware processor to: cause said client device to receive said directional signal, determine a back-azimuth of said client device relative to said reference azimuth, and determine whether said back-azimuth of said client device is within said angular sector.

In some embodiments, the transmitting device further comprises a phased array antenna configured to transmit a plurality of said directional signals covering a plurality of angular sectors.

In some embodiments, each of said angular sectors has an angle of between 5 and 60 degrees.

In some embodiments, the client device is further configured to determine at least some of a location, an altitude, a velocity, an acceleration, an orientation, and/or an azimuth relative to a reference azimuth, of said client device.

In some embodiments, the transmitting device and said client device are located at different heights.

In some embodiments, the transmitting device is configured to transmit said plurality of directional signals using at least one wireless protocol selected from the group consisting of: Bluetooth, Bluetooth Low-Energy (BLE), and wireless local area network (WLAN).

There is further provided, in accordance with an embodiment, a method comprising: operating a client device comprising at least one hardware processor and a non-transitory computer-readable storage medium having stored thereon program instructions, the program instructions executable by the at least one hardware processor to: cause the client device to receive at least some of a plurality of directional signals transmitted by a transmitting device, wherein said transmitting device is configured to transmit, in at least one plane, said plurality of directional signals, each covering an angular sector, wherein every adjacent pair of said angular sectors overlaps partially to create a logical sector, and wherein each of said plurality of directional signals encodes at least an indication regarding each said logical sector associated therewith, calculate a signal strength level (RSL) value for each of said received directional signals, and determine that said client device is located within a said logical sector, when two highest said RSL values (i) are related to two said directional signals associated with said logical sector, and (ii) are within a specified value range of each other.

There is further provided, in accordance with an embodiment, a computer program product comprising a non-transitory computer-readable storage medium having program instructions embodied therewith, wherein the program instructions, when executed by a client device comprising at least one hardware processor, causes the client device to: receive at least some of a plurality of directional signals transmitted by a transmitting device, wherein said transmitting device is configured to transmit, in at least one plane, said plurality of directional signals, each covering an angular sector, wherein every adjacent pair of said angular sectors overlaps partially to create a logical sector, and wherein each of said plurality of directional signals encodes at least an indication regarding each said logical sector associated therewith; calculate a signal strength level (RSL) value for each of said received directional signals; and determine that said client device is located within a said logical sector, when two highest said RSL values (i) are related to two said directional signals associated with said logical sector, and (ii) are within a specified value range of each other.

In some embodiments, the at least one plane comprises one or more of a horizontal plane and a vertical plane.

In some embodiments, the program instructions further cause the client device to determine at least some of a location, an altitude, a velocity, an acceleration, an orientation, and/or an azimuth relative to a reference azimuth, of said client device.

In some embodiments, the program instructions further cause the client device to calculate a location of said client device based, at least in part, on (i) said determination, and (ii) a calculation of a distance from said transmitting device based on said two highest said RSL values.

In some embodiments, the receiving comprises receiving a plurality of directional signals transmitted by two or more said transmitting devices, and wherein said determining comprises determining that said client device is located within at least two intersecting said logical sectors, wherein each of said intersecting logical sectors is transmitted by a different one of said transmitting devices.

In some embodiments, the program instructions further cause the client device to calculate a location of said client device based, at least in part, on (i) said determination, and (ii) a calculation of a distance from each of said transmitting devices, based on said two highest said RSL values associated with each of said transmitting device.

In some embodiments, each of said angular sectors has an angle of between 5 and 60 degrees, and each of said logical sectors has an angle of between 2.5 degrees and 30 degrees.

In some embodiments, the specified range is between 0 and 6 dBm.

In some embodiments, the program instructions further cause the client device to determine that it is located at a midpoint between a said logical sector and a first said angular sector of a said adjacent pair creating said logical sector, when one of said two highest said RSL values corresponding to a second said angular sector of said adjacent pair corresponds to a location of said client device outside said second angular sector.

In some embodiments, the program instructions further cause the client device to determine a pointing orientation of said client device relative to said transmitting device, by: calculating, by said client device, a back-azimuth of said client device relative to a reference azimuth; and determining, by said client device, based on information encoded in each of said directional signals, whether said back-azimuth of said client device is within any of (i) said angular sectors or (ii) said logical sectors.

In some embodiments, the program instructions further cause the client device to receive said plurality of directional signals using at least one wireless protocol selected from the group consisting of: Bluetooth, Bluetooth Low-Energy (BLE), and wireless local area network (WLAN).

There is further provided, in accordance with an embodiments, a method comprising: operating a client device comprising at least one hardware processor and a non-transitory computer-readable storage medium having stored thereon program instructions, the program instructions executable by the at least one hardware processor to: cause the client device to receive a directional signal transmitted by a transmitting device, wherein said transmitting device is configured to transmit at least one directional signal covering an angular sector, said directional signal comprising data regarding at least: an identifier for said directional signal, and an azimuthal direction of said angular sector relative to a reference azimuth; determine a back-azimuth of said client device relative to said reference azimuth; and determine whether said back-azimuth of said client device is within said angular sector.

There is further provided, in accordance with an embodiment, a computer program product comprising a non-transitory computer-readable storage medium having program code embodied therewith, wherein the program code, when executed by a client device comprising at least one hardware processor, causes the client device to: receive a directional signal transmitted by a transmitting device, wherein said transmitting device is configured to transmit at least one directional signal covering an angular sector, said directional signal comprising data regarding at least: an identifier for said directional signal, and an azimuthal direction of said angular sector relative to a reference azimuth; determine a back-azimuth of said client device relative to said reference azimuth; and determine whether said back-azimuth of said client device is within said angular sector.

In some embodiments, each of said angular sectors has an angle of between 5 and 60 degrees.

In some embodiments, the program instructions further cause the client device to determine at least some of a location, an altitude, a velocity, an acceleration, an orientation, and/or an azimuth relative to a reference azimuth, of said client device.

In some embodiments, the transmitting device and the client device are located at different heights.

In some embodiments, the program instructions further cause the client device to receive said plurality of directional signals using at least one wireless protocol selected from the group consisting of: Bluetooth, Bluetooth Low-Energy (BLE), and wireless local area network (WLAN).

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 2A-2E are schematic illustrations of a 'logical' beam system, according to some embodiments;

DETAILED DESCRIPTION

Figure 1:
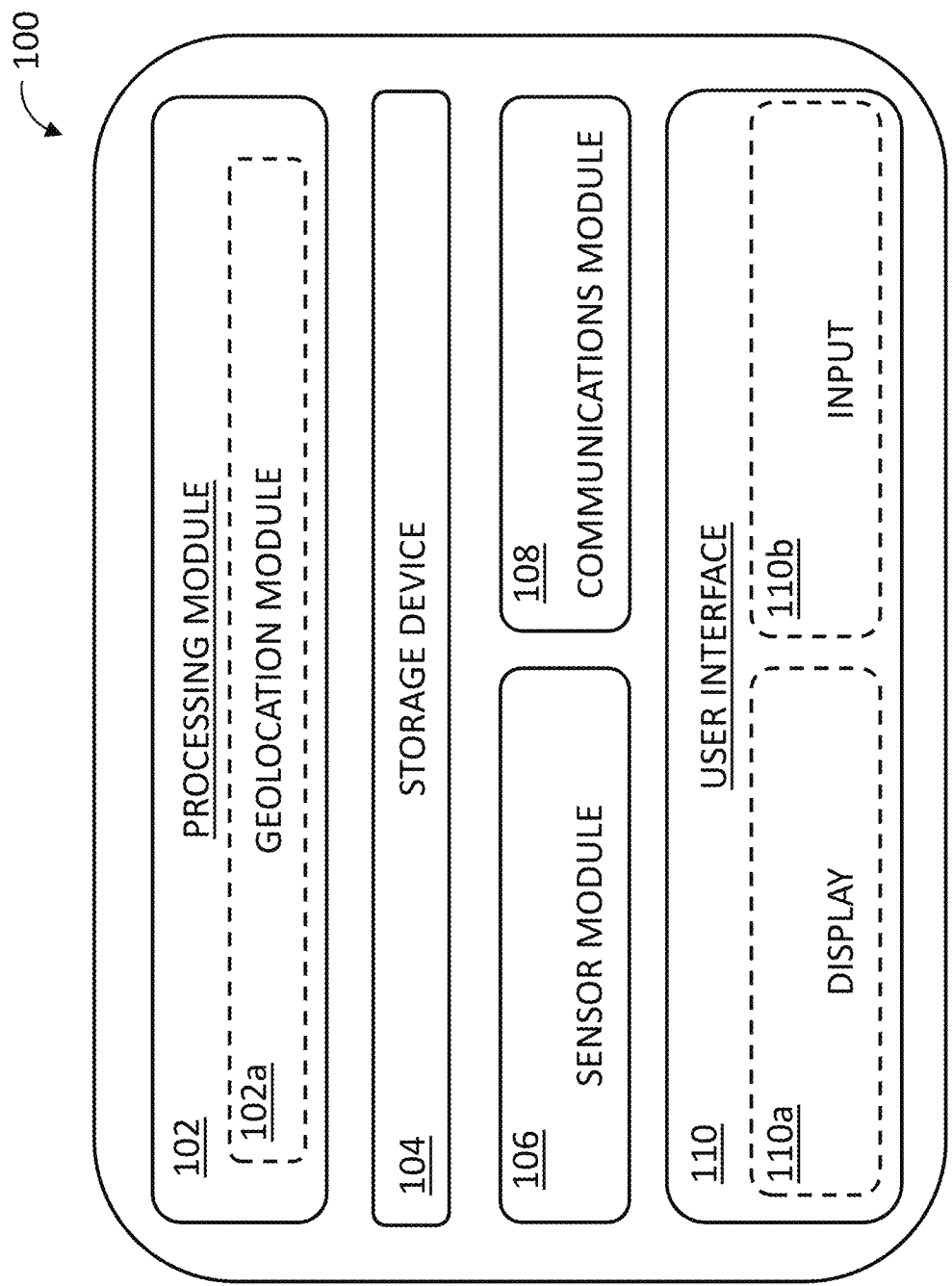
FIG. 1 is a block diagram, of an exemplary mobile device, according to an embodiment.

Disclosed herein are systems, methods, and computer program products for position and/or orientation awareness of a client device within a physical location, based on one or more directional beacons disposed about the physical location. In some embodiments, the directional beacons are configured to transmit signals using a directional methods, such as phased-array antenna technology. The physical location may be any location where a client device may be physically present. Examples of physical locations include, but are not limited to, a building, a store, a restaurant, an airport, an airplane, a train, bus, and the like. A physical location also may be a particular portion of a building, a store, a restaurant, an airport, an airplane, a train, bus, and the like.

For the purpose of the following discussion, the term "directional beacon" will refer to an electronic device configured to continuously transmit data packets (also referred to as 'advertisements') in a beam of radio waves steered to point in different directions.

The term "phased array", also referred to as "electronically scanned array," refers to a computer-controlled array of antennas which creates a beam of radio waves which can be electronically steered to point in different directions, without physically moving the antennas. In an array antenna, the radio frequency current from the transmitter is fed to the individual antennas with a specific phase relationship, so that the radio waves from the separate antennas add together to direct the radiation only in a desired direction.

Directional beacons typically communicate over wireless protocols such as Bluetooth, Bluetooth Low-Energy (BLE), and/or a wireless local area network (WLAN). Directional beacons may be configured to transmit advertisements continuously, in set intervals. The frequency of the sending of advertisements may be programmable; for example, a signal may be sent every 100-400 milliseconds. Likewise, the transmission distance may be programmable within a range of a few centimeters to 40-50 meters. There are currently several types of beacons and associated protocols available in the market, such as iBeacon system (implemented by Apple, Inc.), AltBeacon (provided by Radius Networks), s-Beacon (from Signal360, Inc.), and Eddystone (from Google LLC).

Advertisements typically include a universally unique identifier (UUID) and other data. In some cases, these additional data may include information regarding the geographic location of the beacon, its orientation, the direction of the beam, etc. In some cases, advertisements may also include a reference Received Signal Strength Level (RSL) value, also referred to as Received Signal Strength Indicator (RSSI). For example, an advertisement may include a reference RSL at a distance of 1 meter from the directional beacon. A receiving device may measure the actual RSL of the received signal and compare it to the reference RSL included in the advertisement. Based on the comparison, the receiving device may approximate a distance between the directional beacon and the device. The UUID, RSL, and other data may all be used by a receiving client device, e.g., to determine a physical location of the device, an orientation of the device, and/or trigger a location-based action on the device.

In some embodiments, the present invention provides for higher-resolution location and orientation awareness of a mobile device, using one or more directional beacons employing a specific directional beam configuration, termed herein 'logical' beam. The use of logical beams may provide improved position resolution especially in indoors settings, while reducing the required antenna size of the directional beacon.

Achieving improved position accuracy based on RSL measurements depends, among other things, on the directional accuracy of the transmitted beam. This is due in part to complex signal propagation properties. For example, in omnidirectional transmissions, the phenomenon of 'multipath fading' may cause a receiving device to see the superposition of multiple copies of the transmitted signal, each traversing a different path. The results may distort received signal strength (by either amplifying or attenuating it), and therefore diminish the accuracy of RSL-based systems.

Accordingly, a more focused beam may help to improve location resolution. However, one limiting factor in achieving a more directionally-accurate beam is physical antenna size. The physical size of a phased array antenna is directly related to its operating wavelength and desired directional accuracy, wherein lower operating frequencies and greater accuracy typically require a larger antenna size. For example, achieving a directional beam with a beam angle of 30°, operating at the common 2.4 GHz radio frequency band of Bluetooth and WiFi, would require an antenna that is approximately 24 cm×24 cm in size. Such a layout may achieve position resolution of approximately 2 meters within a distance of 4 meters.

Accordingly, a potential advantage of the present invention is in that it provides for a more directionally-accurate 'logical' beam, and, therefore, improved position resolution, without requiring a larger antenna size. In some embodiments, the present invention may improve position resolution by approximately 50% for a given antenna size. The ability to use a relatively smaller antenna is clearly desirable, particularly when mobile devices are concerned.

FIG. 1 shows a functional block diagram of an electronic mobile device 100 that may be used in conjunction with the present invention, according to some embodiments. In some embodiments, mobile device 100 may be any wireless computing device, comprising at least one processor, memory elements, and at least one transceiver (or transmitter/receiver pair) configured to wirelessly communicate data. Examples of a mobile device include, but are not limited to, a smartphone, a laptop computer, a notebook computers, a tablet, a smart watch, or another wearable device. Mobile device 100 may comprise a processing module 102, including one or more hardware processors. Processing module 102 may be connected to a non-volatile computer readable storage device 104 having program instructions which are executable by processing module 102. Processing module 102 may comprise a geolocation module 102a operating, e.g., based on suitable computer software instructions stored on storage device 104. Geolocation module 102a may be configured for calculating (i) a location of mobile device 100, (ii) a motion component that outputs motion information as a function of movement(s) of mobile device 100, and (iii) a directional component that outputs direction information as a function of an orientation of mobile device 100. Geolocation module 102a may calculate these components based, at least in part, on measurements relating to location, altitude, velocity, acceleration, and/or spatial orientation of mobile device 100. In some embodiments, these measurements are provided by a sensor module 106, which comprises multiple sensors, such as an accelerometer and/or a gyroscope, a temperature sensor, a barometer, a compass, and/or a global positioning system (GPS), etc. In some embodiments, geolocation module 102a may be configured to process beacon signals, to determine (or estimate) a distance of mobile device 100 to the beacon, based, e.g., on RSL values of beacon transmissions measured by sensor module 106.

In some embodiments, mobile device 100 comprises a communications module 108, which may be any suitable communications circuitry operative to connect to a communications network and to transmit communications from the mobile device 100 to other devices within the communications network. Communications module 108 may be operative to interface with the communications network using any suitable communications protocol, such as Bluetooth, Bluetooth Low-Energy (BLE), and wireless local area network (WLAN). In some embodiments, communications module 108 is configured to receive and transmit over, e.g., 2.4 GHz, 3.6 GHz, 4.9 GHz, 5 GHz, and/or 5.9 GHz bands. In other embodiments, communications module 108 is configured to transmit in one or more frequency bands between 1 GHz and 7 GHz.

, for example, WiFi, Bluetooth, and/or other communications protocols. Mobile device 100 may further comprise a user interface module 110, comprising, e.g., a display 110a and an input mechanism 110b.

FIG. 2A is a schematic illustration of a 'logical' beam system 200, according to some embodiments of the present invention. A directional beacon 202 comprising a programmable phased array antenna is used to transmit a directional beam along a sweep path (which may be horizontal, vertical, or otherwise) comprising, e.g., azimuth sectors A-F. In some embodiments, beacon 202 is configured to transmit using at least one wireless protocol such as Bluetooth, Bluetooth Low-Energy (BLE), and wireless local area network (WLAN). In some embodiments, beacon 202 is configured to transmit over, e.g., 2.4 GHz, 3.6 GHz, 4.9 GHz, 5 GHz, and/or 5.9 GHz bands. In other embodiments, beacon 202 is configured to transmit in one or more frequency bands between 1 GHz and 7 GHz.

A client device, such as mobile device 100 described with reference to FIG. 1, receives the directional beacon advertisements and is configured to calculate RSL values for each received beam. Based on the calculated RSL values, mobile device 100 may determine its location within the area of a beam sector.

In some embodiments, a narrower 'logical' beam may be created by directional beacon 202 through directing a pair of beams in adjacent sectors in the azimuth plane, e.g., beams C and D, such that their respective beam volumes partially overlap and create a common coverage sector C/D. Sector C/D is narrower than either of sectors C or D. Thus, using the same hardware components and antenna size, there may be created a narrower beam in the azimuth plane, which may improve position resolution.

In some embodiments, the transmitted beams of directional beacon 202 may include advertisements comprising, e.g., a beacon identifier and a beam identifier, including azimuth angles of the beam relative to the magnetic north. In some embodiments, beacon advertisements for each beam include information identifying the beams comprising any beam pairing which creates a 'logical' beam, including the azimuth angles of the overlapping area.

Based on this identifying information in combination with the measured RSL values received by mobile device 100 from each beam in sectors A-F, mobile device 100 may calculate its location. For example, when mobile device 100 is within the coverage area of sector B, mobile device 100 may measure RSL values for each beam, which indicate that the strongest signal is being received from beam B. Similarly, when mobile device 100 is within the coverage area of 'logical' beam C/D, it will measure RSL values which indicate that both beams C and D are being received as the strongest signals, within a specified range. Based on the pairing identification information included in the advertisements, mobile device 100 may determine that individual beams C and D are being paired into a 'logical' beam. Mobile device 100 may thus determine that it is positioned within the common coverage area of 'logical' beam C/D. Because, as noted above, the coverage area of 'logical' sector C/D is narrower than that of each of individual sectors C and D separately, the position of mobile device 100 may thus be determined with a greater degree of accuracy, while still relying on the same hardware components of system 200.

Figure 2B:
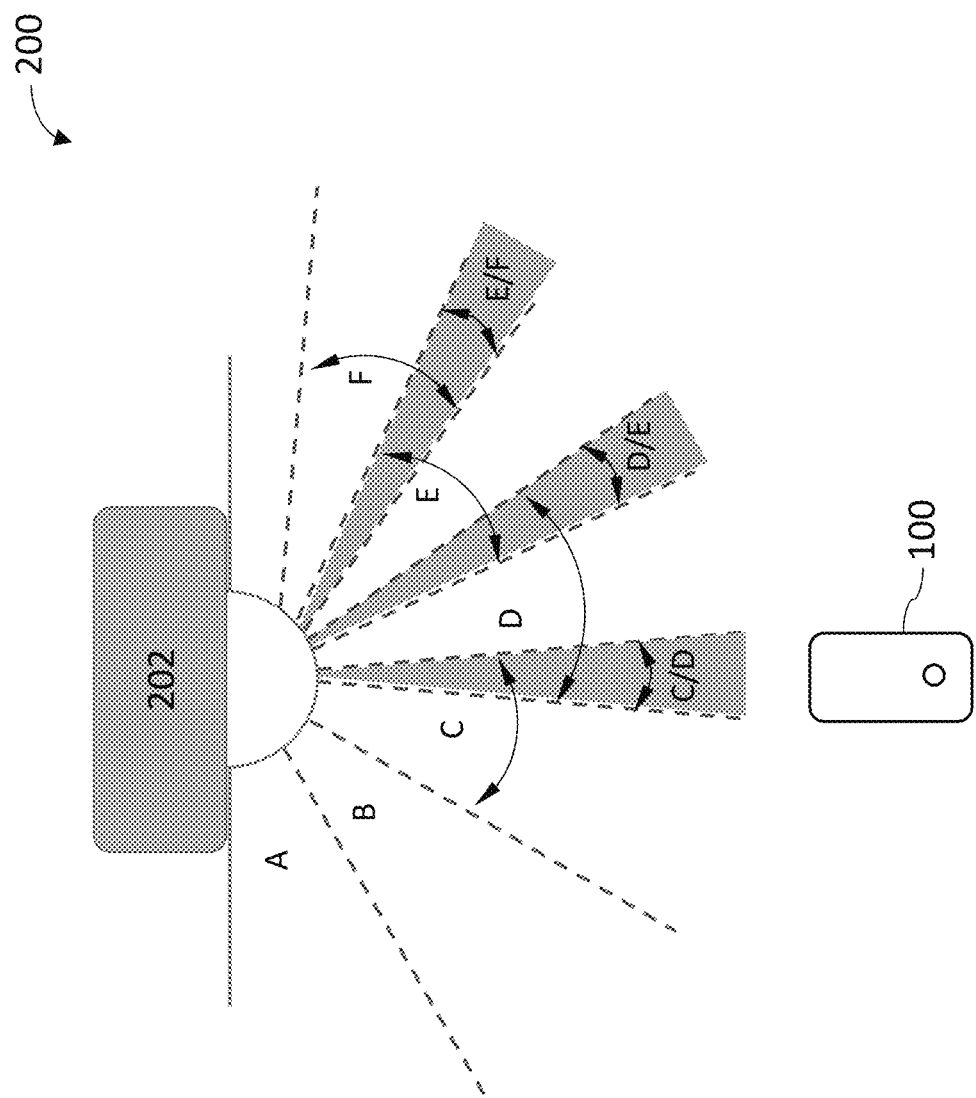

As shown in FIG. 2B, in some embodiments, directional beacon 202 may be configured to create a plurality of 'logical' beams, by intersecting more than one pair of adjacent beams. In some embodiments, an individual beam may be intersected with adjacent individual beams on either side, to create multiple 'logical' beams. For example, by intersecting adjacent beams D, E and E, F, additional logical beams D/E and E/F may be created.

Figure 2C:
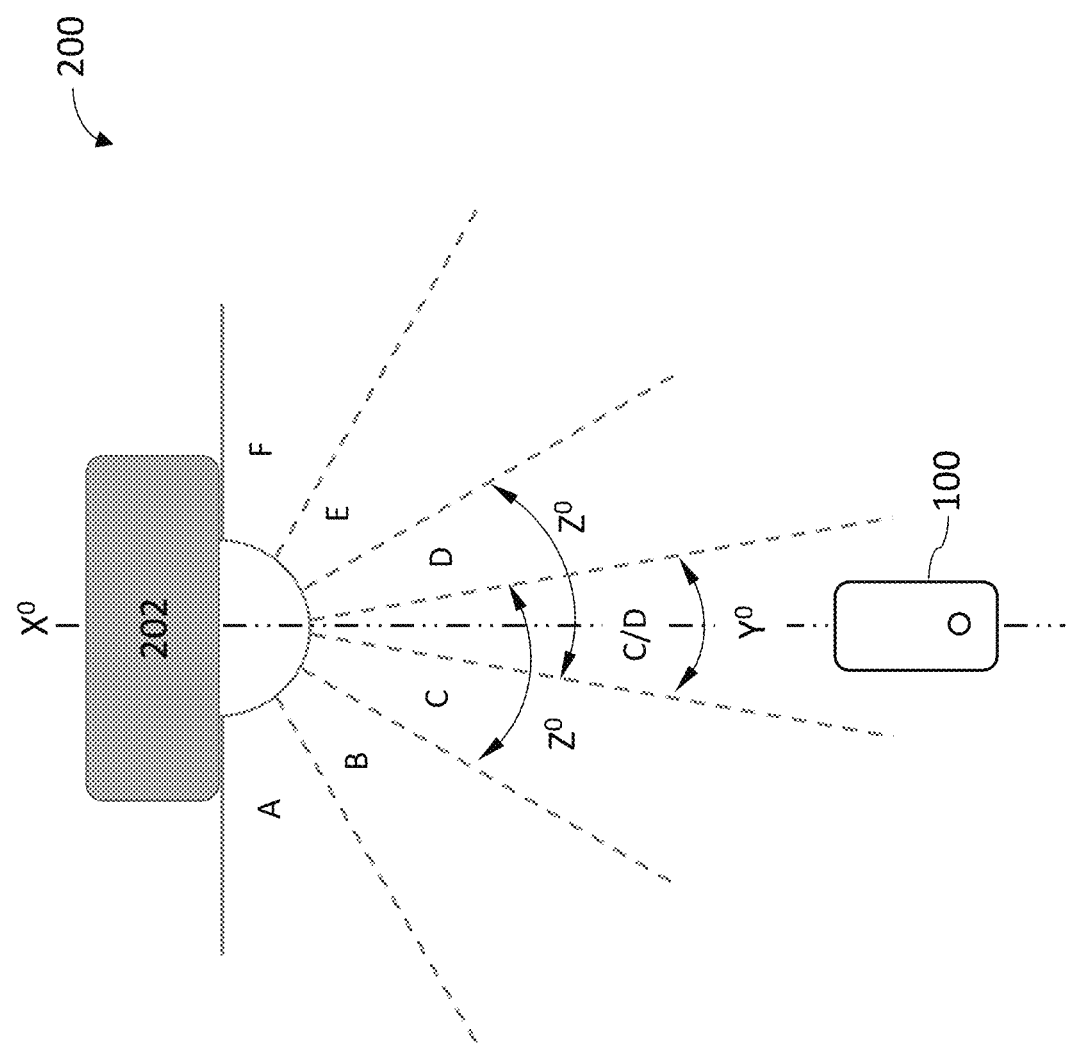

With reference to FIG. 2C, in some embodiments, directional beacon 202 is configured for creating a 'logical' beam C/D having a beam angle Y°, from a pair of adjacent beams C, D having each a beam angle Z° which is greater than Y°. To create beam C/D, directional beacon 202 is configured to set a start angle of beam C relative to reference axis X° such that it is equal to $$X° - (Z° - Y°/2),$$

and to set a start angle of beam D relative to axis X° such that it is equal to $$X° + (Z° - Y°/2).$$

Setting the start angles of beams C, D in this way creates an overlap area equal to beam angle Y° directed along axis X°. Additional logical beams may then be created using the same process.

In some embodiments, mobile device 100 is configured to receive all beam signals in the vicinity, and sort them into 'logical' pairs based on their RSL values. Mobile device 100 may then determine that it is within the sector of the 'logical' beam based upon finding the beam pair having the strongest RSL values, within a specified range from each other. In some embodiments, the specified range is 0 dBm to 7 dBm. Table 1 illustrates this process with numerical examples:

TABLE 1

| Beacon ID | Beam ID | Logical Beam ID | RSL Value |
|---|---|---|---|
| Tx1 | A | A/B | −50 dBm |
| Tx1 | B | A/B | −55 dBm |
| Tx1 | C | C/D | −20 dBm |
| Tx1 | D | C/D | −23 dBm |
| Tx1 | E | E/F | −75 dBm |

TABLE 1-continued

| Beacon ID | Beam ID | Logical Beam ID | RSL Value |
|---|---|---|---|
| Tx1 | F | E/F | −73 dBm |

In the example in Table 1, mobile device 100 receives beam signals from beams A through F. Beacon advertisements include, among other data, beam IDs and information regarding beam pairings, which enables mobile device 100 to identify the logical beams of system 200. From the group in Table 1, beam signals C and D are both received with the strongest RSL values, within a specified range of each other. Accordingly, mobile device 100 may determine that it is located within the area of coverage of logical beam C/D.

Figure 2D:
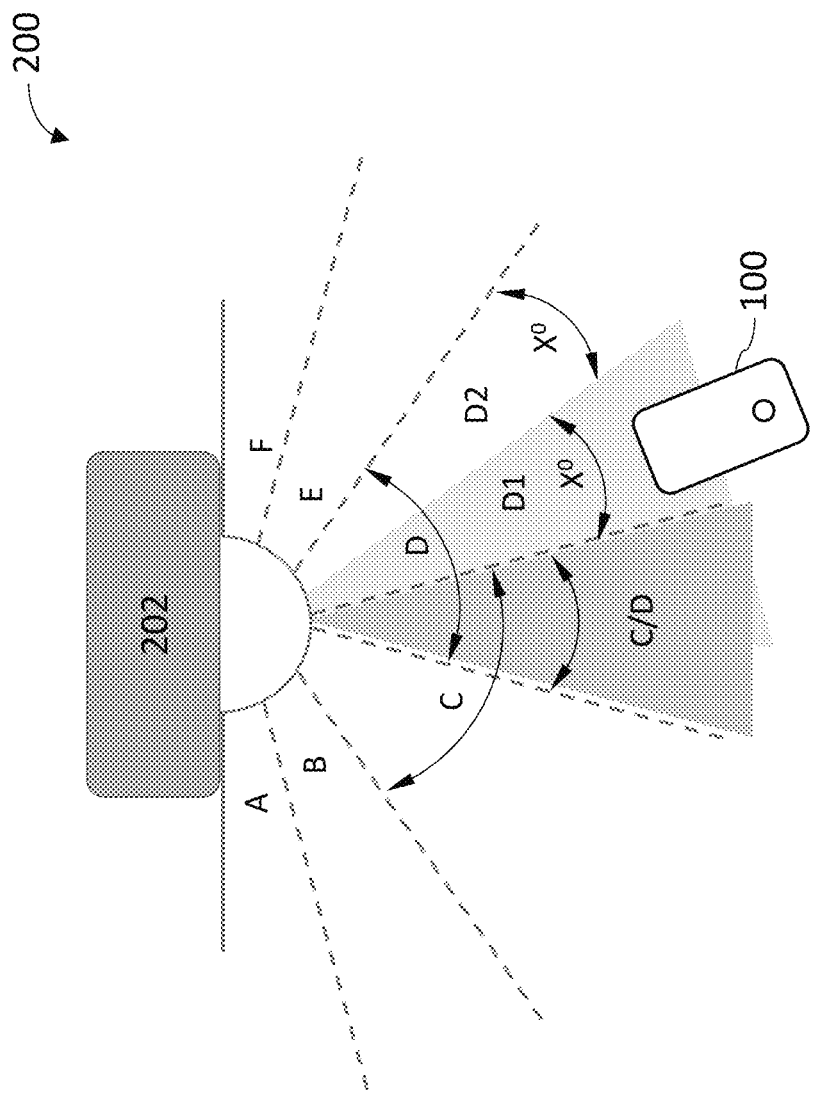

With reference to FIG. 2D, in some embodiments, mobile device 100 is further configured to take into account RSL measurement noise, which may affect the accuracy of location determination by mobile device 100. In some cases, the measurement noise may account for a significant portion of the expected signal strength differences between adjacent sectors, and thus may cause a decision error between two adjacent sectors.

For example, mobile device 100 may be configured to consider RSL values within a range of up to 6 dBm from each other as falling within the same logical sector, based on an expected RSL measurement noise of ±3 dBm. Assuming an attenuation between adjacent sectors of 6 dBm, there may be cases where RSL measurements outside a logical sector may erroneously indicate a possible location within the logical sector. As shown in table 2, in some cases, RSL measurement ranges for beams C, D may come within a 6 dBm range from one another, when mobile device 100 is actually not located in sector C/D:

TABLE 2

| Location Area | Beam C RSL (dBm) | Beam D RSL (dBm) |
|---|---|---|
| C/D | 0 ± 3 = 3 − (−3) | 0 ± 3 = 3 − (−3) |
| D1 | −6 ± 3 = (−3) − (−9) | 0 ± 3 = 3 − (−3) |
| D2 | −10 ± 3 = (−7) − (−13) | 0 ± 3 = 3 − (−3) |

For example, in sector C/D both beams C, D are received at ±3 dBm of their peak. In sector D1, beam D continues to be received at ±3 dBm of its peak, but beam C may experience a general signal attenuation of 6 dBm, and be received at between −3 and −9 dBm of its peak. Thus, in some cases, both beams C, D may be measured at values that are within 6 dBm from each other, which result may be consistent with a location of mobile device 100 within sector C/D as well as sector D1. Even in sector D2, where beam C may experience an attenuation in strength of 10 dBm, there may be marginal instances where the respective received RSL values of beams C, D may come within 6 dBm of each other. Accordingly, in some embodiments, in cases in which mobile device 100 receives RSL measurements associated with a pair of sectors constituting a logical beam, which may be consistent with both a location within the logical sector and within one of the constituent sectors, mobile device 100 may be configured to determine its location at, e.g., a midpoint between the logical sector and the relevant constituent sector.

Figure 2E:
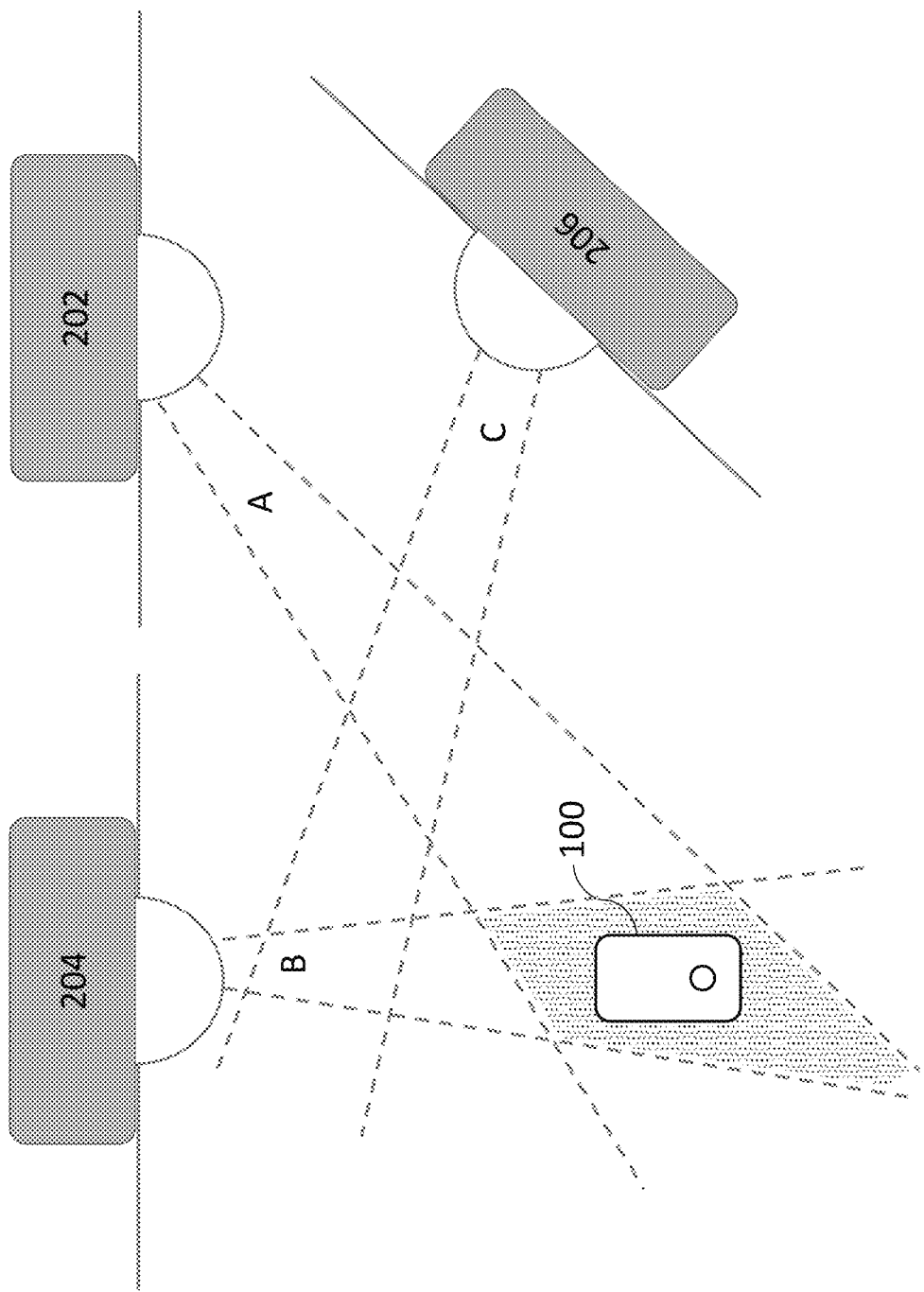

With reference to FIG. 2E, in some embodiments, greater position resolution yet may be achieved by employing cell-based methods to determine the location of a client device, such as mobile device 100, by combining data from several beacons 202, 204, 206. Mobile device 100 is located in a region covered by both beams A and B, of beacons 202 and 204, respectively. In some embodiments, beams A, B may be 'logical' beams created by overlapping individual adjacent beam, as described above. However, mobile device 100 is out of range of beam C of beacon 206. Accordingly, it may be determined that mobile device 100 must be located in the shaded region of the intersection of beams A and B. As an example, given that beams A and B have a beam angle of 5° each, and the mobile device 100 is located at a distance of 5 meters away from beacon 202, and 3 meters away from beacon 204, the location of mobile device 100 may be narrowed down to an area that is approximately 50 cm×86 cm.

The embodiments of the present invention described with reference to FIGS. 2A-2E have been discussed with respect to a system for higher-resolution location awareness operating in the horizontal plane. As noted above, a directional beacon device, such as beacon 202, also may be positioned to as to transmit one or more directional beams along a sweep path which may be vertical or otherwise, and thus provide location awareness in other axes.

In other embodiments, a matrix comprising a plurality of phased-array antenna elements may be configured to transmit one or more directional beams, e.g., alternately along both a horizontal and vertical sweep paths. In such embodiments, the present invention may provide for location awareness within both the horizontal and vertical dimensions. Such systems may further employ logical beam technology, so as to improve position resolution in one or both dimensions.

Figure 3:
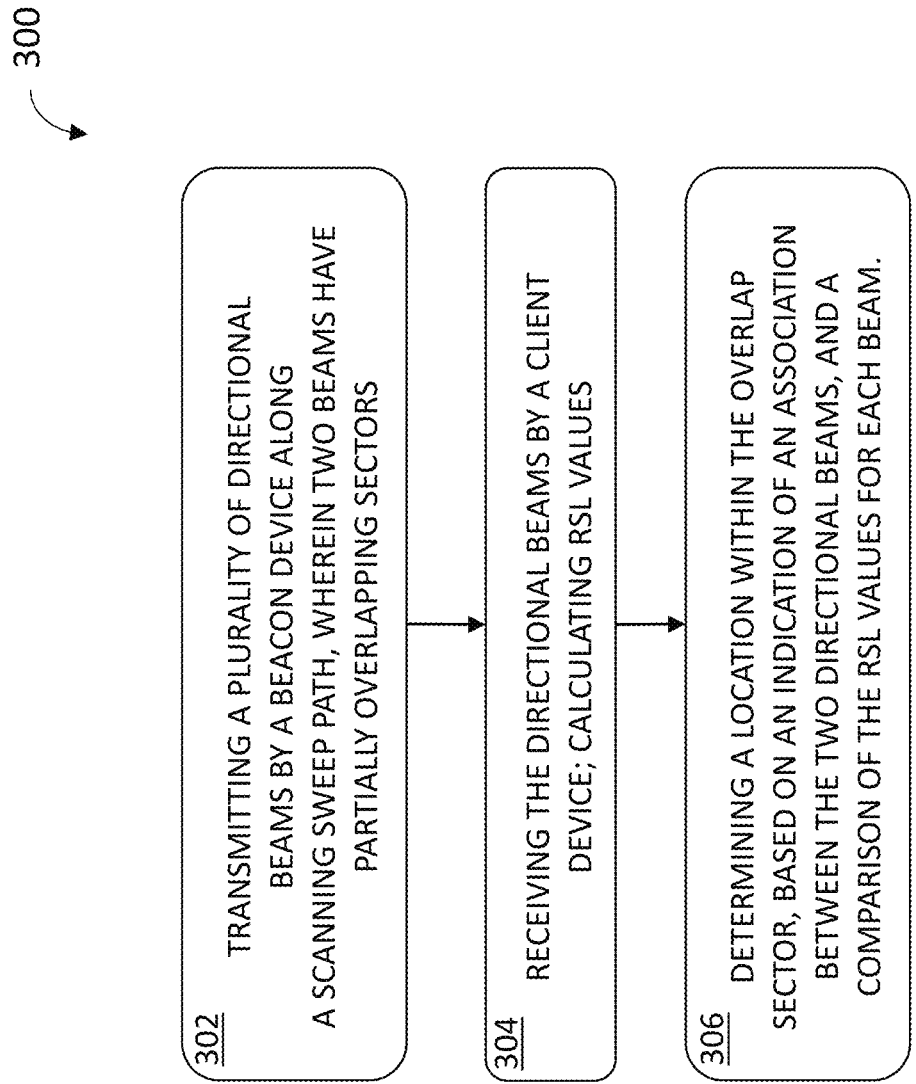
FIG. 3 is a flowchart of a method for location awareness of a mobile device, according to an embodiment.

FIG. 3 is a flowchart of a method 300 for location awareness of a mobile device, according to some embodiments. At 302, a beacon device transmits directional signals along a sweep path. At least two of the signals have partially overlapping sectors, so as to create a third, 'logical,' sector that is narrower than each separate sector. Each signal comprises at least an identifier for the directional signal, and an indication of an association between the overlapping directional signals. At 304, a client device receives the directional calculates a signal strength level (RSL) value for each of the received signals. At 306, the client device determines whether it is located within the 'logical' sector based on the indication of the association between the directional signals, and a comparison of the RSL values for each signal.

In some embodiments, the present invention provides for the automated determination of a pointing orientation of a mobile device, based, at least in part, on data measured by sensors of the mobile device and/or information received from one or more directional beacons in the vicinity of the device. The mobile device, such as mobile device 100 in FIG. 1, is configured to process at least one of a position, motion, and direction information of the mobile device, to determine a pointing orientation of the mobile device with respect to a point of interest.

In various embodiments of the present invention, a mobile device is configured to enable a user to point the device directionally at a point of interest, and receive information, content, and/or services in response from a device, an appliance, a network, and/or as part of a cloud services experience. As an example, by pointing at a particular product on a shelf with a mobile device, a user may receive information or instruments (e.g., coupons, offers, etc.) from entities associated with the product.

In some embodiment, location and orientation information for the device may be determined based on, e.g., one or more sensors of the device and/or one or more wireless beacons transmitting in the vicinity of the device. For example, location information may be obtained based, e.g., on a GPS sensor and/or on calculating a distance from each beacon. Orientation information may be obtained based on at least one of a compass sensor, an accelerometer, a gyroscope, a barometer, and/or a relative orientation determination based on information received from the more or more wireless beacons.

Figure 4A:
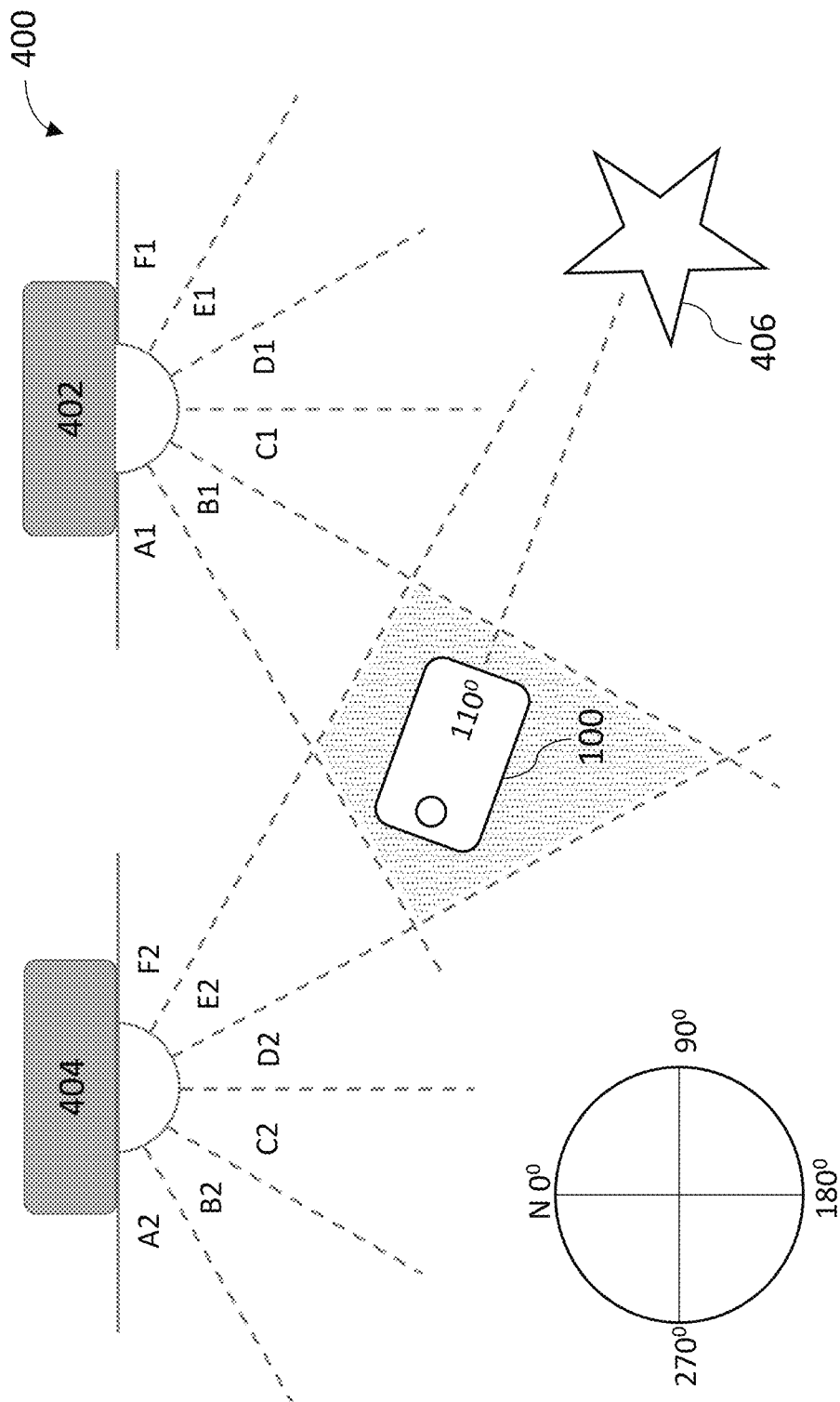
FIGS. 4A, 4B and 5 are schematic illustrations of exemplary systems for automated identification of a pointing orientation of a client device relative to a point of interest, according to some embodiments.

FIG. 4A is an illustration of an exemplary system 400 for automated identification of a pointing orientation of a client device relative to a point of interest, based on an embodiment. In system 400, a client device, such as mobile device 100 described above with reference to FIG. 1, is configured for automatically determining its orientation relative to, e.g., a point of interest 406.

For ease of reference, orientation values will be given herein with reference to a 360° azimuth circle, where 0° represents the magnetic north. In FIG. 4A, mobile device 100 is shown oriented in an azimuth of 110°. Mobile device 100 may be configured to determine its absolute orientation relative to the magnetic north, based, e.g., on a compass or a similar sensor included in sensor module 106 of mobile device 100 (see FIG. 1).

Directional beacons 402, 404 may be disposed in the vicinity of mobile device 100, e.g., within a physical location such as a retail store, where point of interest 406 represents a particular product or display. In some embodiments, fewer or more than two directional beacons may be disposed in the physical location. Directional beacons 402, 404 may incorporate phased-array technology, and thus configured to change beam direction at specified intervals, so as to sweep through multiple azimuth sectors within a sweep cycle, such as sectors A1-F1 of beacon device 402, and sectors A2-F2 of beacon device 404 (referenced by dashed lines in FIG. 4A). In some embodiments, directional beacons 402, 404 may incorporate a 'logical' beam technology, as described above with reference to FIGS. 2A-2C. In some embodiments, Directional beacons 402, 404 are configured to transmit over, e.g., 2.4 GHz, 3.6 GHz, 4.9 GHz, 5 GHz, and/or 5.9 GHz bands. In other embodiments, Directional beacons 402, 404 are configured to transmit in one or more frequency bands between 1 GHz and 7 GHz.

Mobile device 100 is located in a region covered by intersecting sectors (i) B1 of beacon device 402, projecting in azimuth sector 210°-240°, and (ii) E2 of beacon 404, projecting in azimuth sector 120°-150°. Advertisements transmitted by directional beacons 402, 404 may include identifying information regarding each beacon device, as well as information regarding the azimuth range of each beam sector relative to the magnetic north. When directional beacons 402, 404 are configured to transmit 'logical' beams, the advertisements may include information regarding the pairing of individual beams into 'logical' beams.

In some embodiments, mobile device 100 is configured to determine its pointing orientation relative to point of interest 406, by first determining its location based, e.g., on the cell-based method described with reference to FIG. 2E. In this case, mobile device 100 is located in a region covered by both beams B1 and E2, and out of range of all other beams. Accordingly, mobile device 100 may determine that it is located within the shaded intersecting region of beams B1 and E2. Mobile device 100 may then determine its pointing orientation within its location relative to a reference point such as the magnetic north, based, e.g., on its internal compass sensor. In some embodiments, the advertisements transmitted by directional beacons 402, 404 may comprise URL information directing mobile device 100 to a particular website or a cloud server. Mobile device 100 may then transmit its location and orientation information to the website or cloud server. Based on this information and, e.g., a map or a preexisting knowledge of the layout of the physical location, the website or cloud server may determine that mobile device 100 is pointing at product 406, and provide mobile device 100 with relevant information regarding product 406.

Figure 4B:
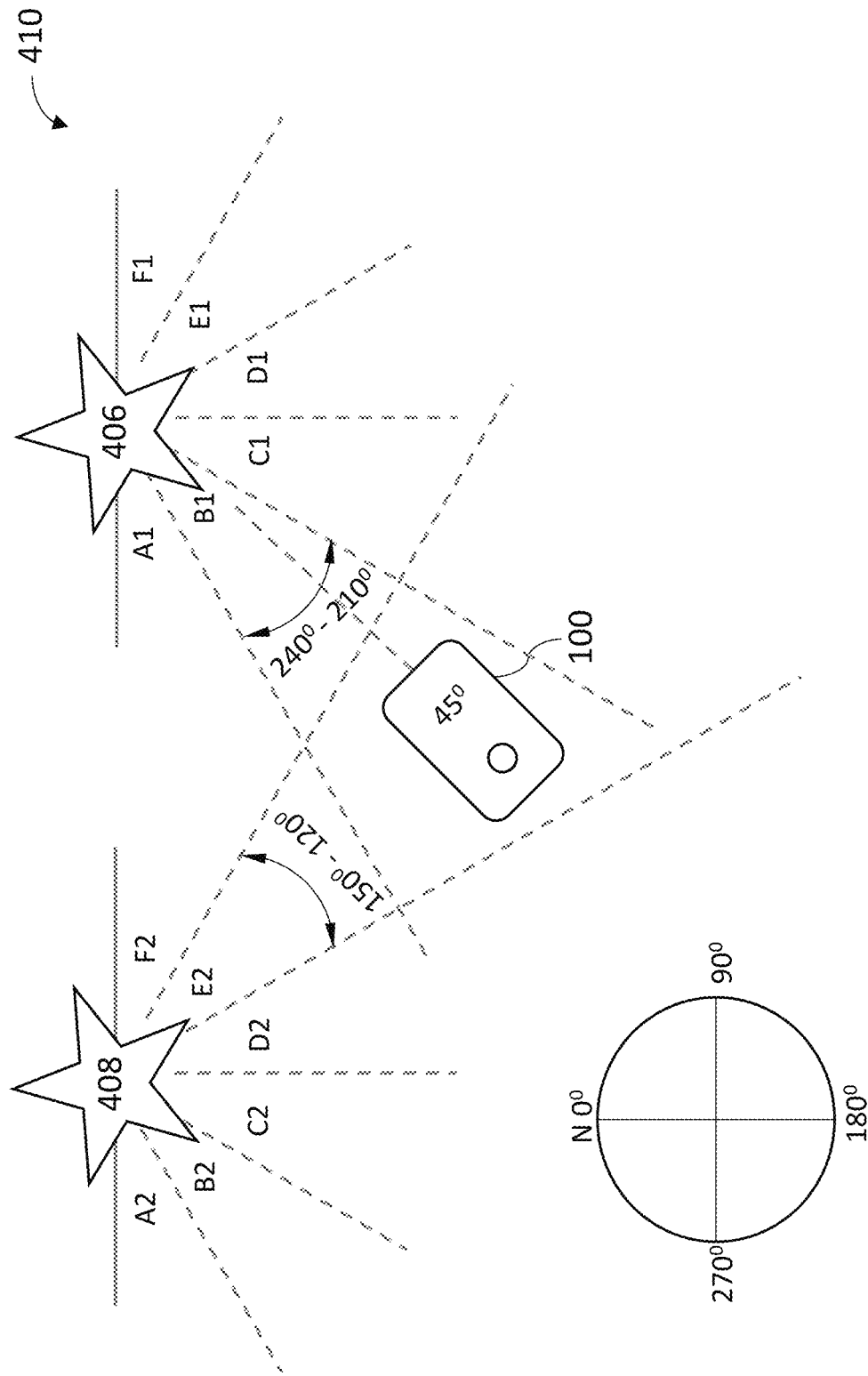

FIG. 4B is an illustration of an exemplary system 410 for automated identification of a pointing orientation of a client device relative to a point of interest, based on an embodiment. In some embodiments, mobile device 100 may be configured to determine its pointing orientation relative to a directional beacon. For example, in some embodiments, a point of interest may comprise a device (e.g., a smart appliance) which may be configured to transmit a directional beacon. In other embodiments a directional beacon device may be attached to, or placed in conjunction with, a point of interest. In such cases, mobile device 100 may be configured to determine its pointing orientation relative to the point of interest, by calculating the orientation of a received beacon transmission originating from the location of the point of interest.

Mobile device 100 may receive one or more directional beacon transmissions B1, E2, originating from a location of one or more points of interest, such as products 406, 408, respectively.

Client device 100 may be configured to determine its orientation relative to each product 406, 408, based on the received directional beacon transmissions B1, E2. Mobile device 100 may know its own azimuth, which in this case is 45°. Mobile device 100 may also know the azimuth sector in which each of beams B1, E2 is being transmitted. For example, mobile device 100 may be able to determine from the information transmitted by each beam, that beam B1 is transmitted over azimuth sector 210°-240°, and that beam E2 is transmitted over azimuth sector 120°-150°. Based on a back-azimuth calculation, mobile device 100 may then determine that it is oriented toward azimuth sector B1, originating from the location of product 406. In this case, the back-azimuth of the orientation of mobile device 100 is 225° (45°+180°). A back-azimuth of 225° falls within the azimuth sector of beam B1 (210°-240°) originating from the location of product 406. Conversely, mobile device 100 can determine that its back-azimuth of 225° is not within the azimuth sector of beam E2 (120°-150°), and accordingly, that it is not pointing in the direction of product 408. In some embodiments, client device 100 may be configured to determine its pointing orientation with respect to directional beams having an azimuth within a range of ±5° to ±25° of the back-azimuth of mobile device 100.

Figure 5:
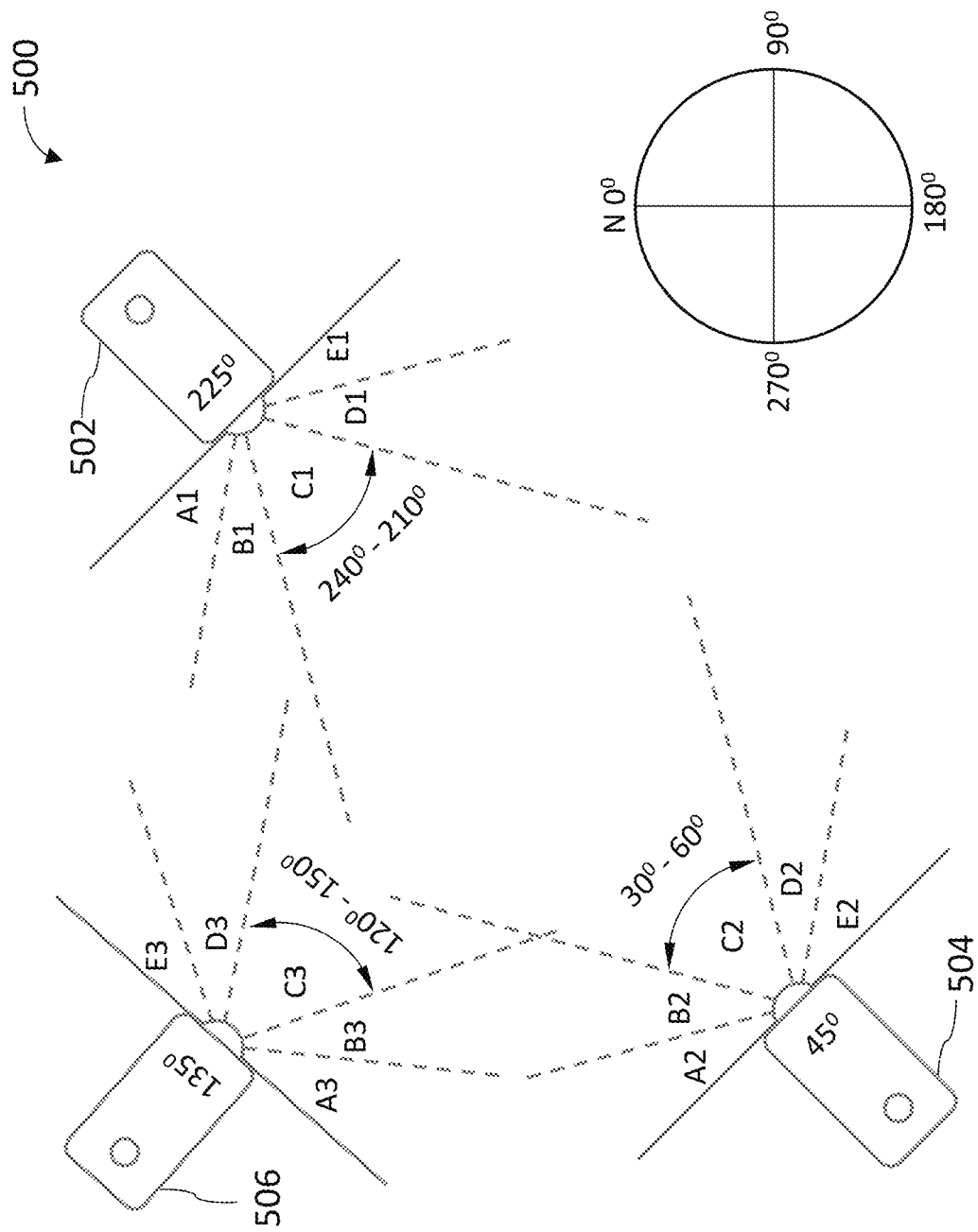

With reference to FIG. 5, in some embodiments, an exemplary system 500 may be used to determine a pointing orientation of two mobile devices relative to one another. For example, mobile device 502, 504, 506 may be configured to determine a pointing orientation relative to one another, for the purpose of, e.g., sharing of content, such as images, videos, text documents, or any other type of data. Mobile device 502, 504, 506 may be similar to mobile device 100 described above with reference to FIG. 1. Each of mobile device 502, 504, 506 may be configured for transmitting a directional beacon, which may include identifying information regarding the transmitting mobile device, as well as information regarding, e.g., the absolute orientation of the device relative to the magnetic north and the azimuth sector of each beam within a 360° azimuth circle, where 0° coincides with the magnetic north.

In some embodiments, the directional beams of mobile devices 502, 504, 506 have a beam angle of between 5° and 60°, e.g., 30°, mobile devices 502, 504, 506 may incorporate phased-array technology, and thus be configured to change beam direction at specified intervals, so as to sweep through multiple azimuth sectors within a sweep cycle, such as sectors A1-E1 of mobile device 502, A2-E2 of mobile device 504, and A3-E3 of mobile device 506 (referenced by dashed lines in FIG. 5). In some embodiments, directional beacons 102, 104 may incorporate a 'logical' beam technology, as described above with reference to FIGS. 2A-2C.

During operation, each of mobile devices 502, 504, 506 continuously transmits its respective beams, and scans wireless channels for beacons in its vicinity. Advertisements transmitted by each of mobile devices 502, 504, 506 include identifying information regarding each mobile device, as well as information regarding the azimuth range of each beam sector relative to the magnetic north. When mobile devices 502, 504, 506 are configured to transmit 'logical' beams, the advertisements may include information regarding the pairing of individual beams into 'logical' beams.

In some embodiments, each of mobile devices 502, 504, 506 is configured to determine its pointing orientation relative to another mobile device, by comparing the orientation of a received beacon transmission originating from the other mobile device to its own orientation. For example, in FIG. 5, mobile device 502 is configured to know its own azimuth, which in this case is 225°. Mobile device 502 may also know the azimuth sector in which beam C2 of mobile device 504 is being transmitted. For example, mobile device 100 may be able to determine from the information transmitted by beam C2, that beam C2 is transmitted over azimuth sector 30°-60°. Based on a back-azimuth calculation, mobile device 502 may then determine that it is oriented toward azimuth sector C2, originating from mobile device 504. In this case, the back-azimuth of the orientation of mobile device 502 is 45° (225°-180°). A back-azimuth of 45° falls within the azimuth sector of beam C2 (30°-60°). Conversely, mobile device 502 can determine that its back-azimuth of 45° is not within the azimuth sector of beam C3 originating from mobile device 506, having an azimuth sector of 120°-150°, and, accordingly, that it is not pointing in the direction of mobile device 506. Similarly, mobile device 504 may perform the same calculations with respect to beam C1 originating from mobile device 502, and determine that it is pointing in the direction of mobile device 502. Accordingly, mobile device 502, 504 may mutually determine that they are pointing in the direction of each other.

The embodiments of the present invention described with reference to FIGS. 4A-4B and 5 have been described with respect to directional beacons, mobile devices, and points of interest located generally on the same or similar spatial plane. However, in some embodiments, pointing orientation by a mobile device may be determined while taking into account height differences between, e.g., a mobile device and a point of interest. Accounting for height differences may be achieved by utilizing, e.g., various sensors, such as those incorporated into sensor module 106 of mobile device 100, including, but not limited to, a barometer, a gyroscopes, accelerometers, and the like. For example, different barometer readings between a mobile device and the plane in which a point of interest is located (as measured, e.g., by a nearby directional beacon) may be combined with gyroscope or accelerometer data indicating a tilt or incline of the mobile device, to determine a three-dimensional pointing orientation of the mobile device.

Figure 6A:
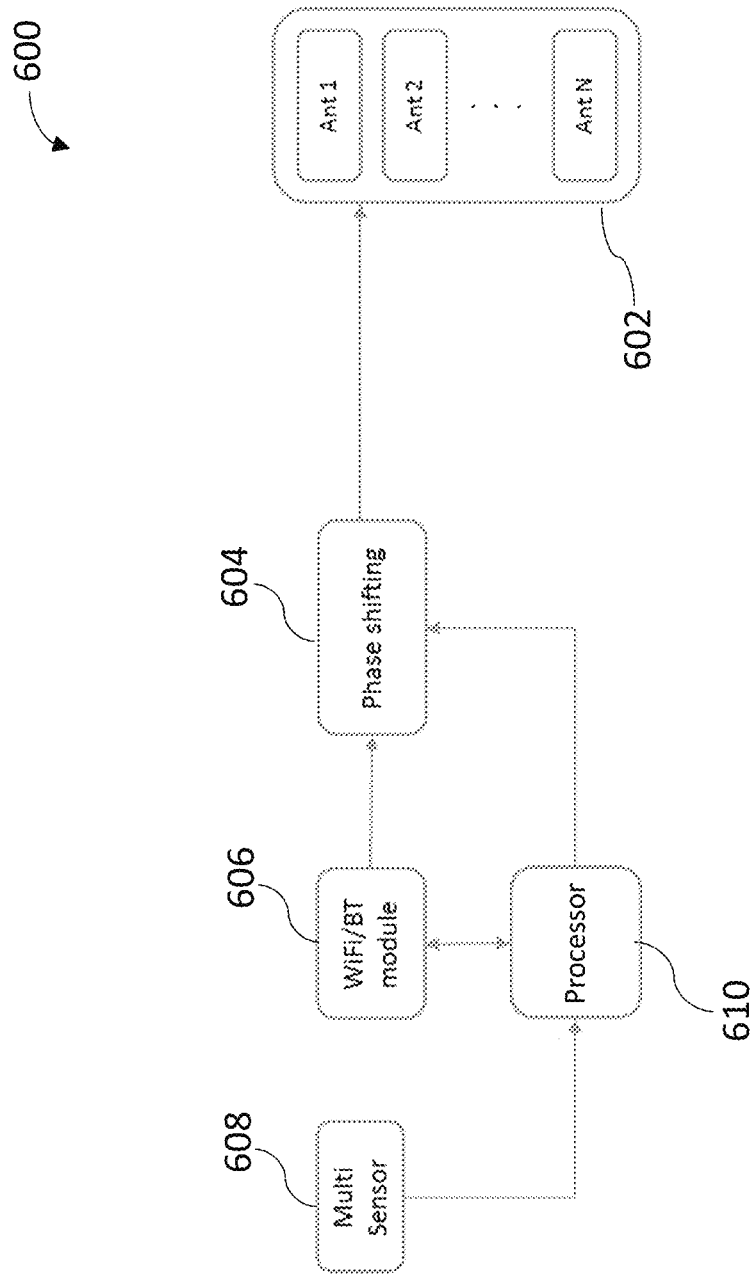
FIGS. 6A-6B are a block diagram of an exemplary beacon device incorporating phased array antenna technology, according to an embodiment.

FIG. 6A is a block diagram of an exemplary beacon device 600 incorporating phased array antenna technology. Beacon device 600 may be a standalone beacon device, or otherwise comprise beacon functionality incorporated within another electronic device, such as a smartphone, a laptop computer, a notebook computer, a tablet, a smart watch, a wearable device, or a smart appliance. Beacon device 600 comprises a phased array antenna 602 comprising multiple antenna elements. Phase shifting module 604 is capable of steering the beam of antenna 602 in different directions. A communication module 606 comprises, e.g., BLE, WiFi, and/or other wireless communication capabilities, and is configured to formulate and transmit beacon advertisements through antenna 602. A multi-sensor module 608 may comprise a plurality of sensor elements, such as a barometer sensor, a gyroscope and/or an accelerometer, and/or the like. Processor module 610 comprises one or more hardware processors and controls the operation of beacon device 600. Processor module 610 may further comprise a non-volatile memory storage module having stored thereon computer software instructions for operating beacon device 600.

Figure 6B:
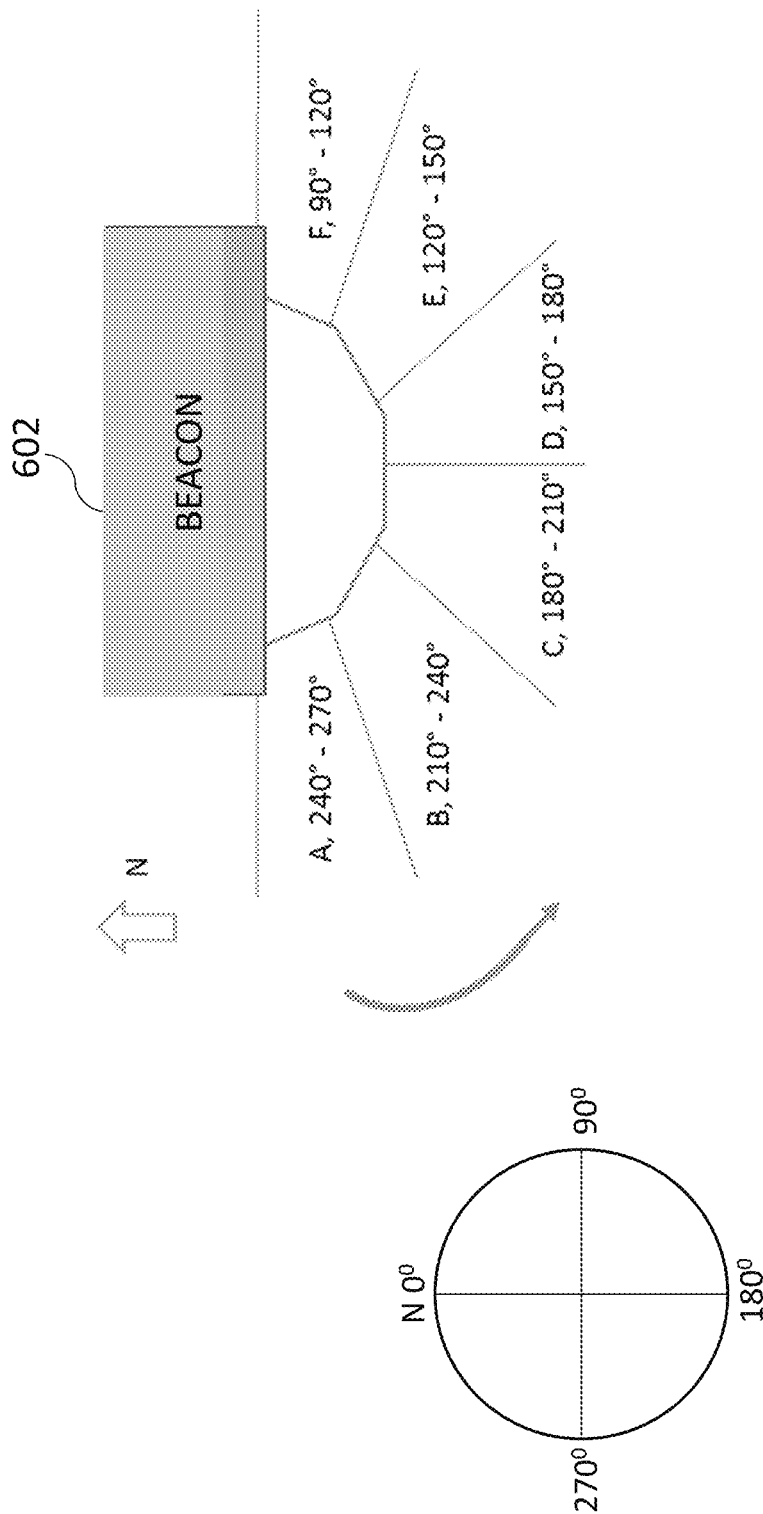

In some embodiments, processor module 600 receives sensor information from multi-sensor module 608 regarding, e.g., a spatial location, azimuthal orientation, and/or altitude, of beacon device 600. Processor module 610 may use this information to calculate, e.g., azimuthal range or elevation values for each directional beam transmitted by beacon device 600, such as directional beams A through F shown in FIG. 6B. This beam-related information may be included in the beacon advertisement formulated by communication module 604.

Figure 7:
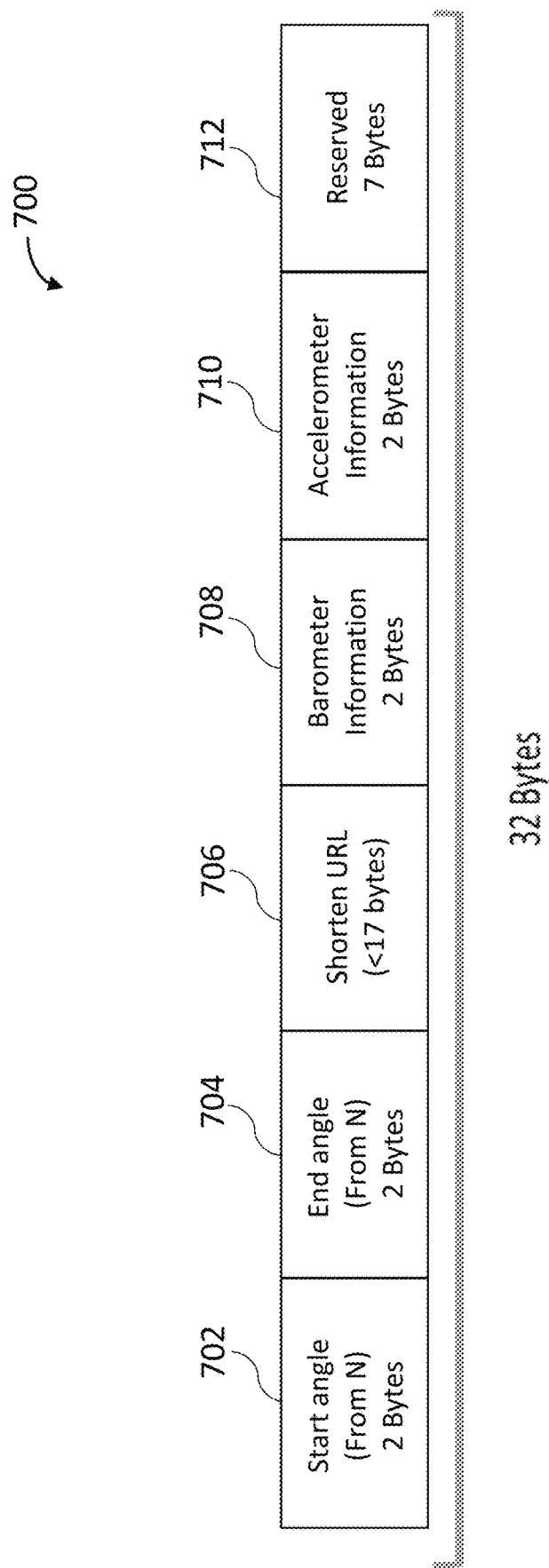
FIG. 7 illustrates an exemplary beacon information packet.

FIG. 7 illustrates an exemplary advertisement or beacon information packet 700, which may be transmitted by beacon device 600 in FIG. 6A, e.g., over a WiFi network using SSID protocol. In other embodiments, advertisement 700 may be transmitted using BLE protocol, and/or any other suitable wireless protocol.

Advertisement 700 comprises, e.g., 32 bytes, and includes start (702) and end (704) azimuth angles of the directional beam being transmitted relative to the magnetic north; a redirection URL (706); and information retrieved from multi-sensor module 608 in FIG. 6A (708, 710). Data space 712 may be reserved for additional and/or future data requirements.

Figure 8:
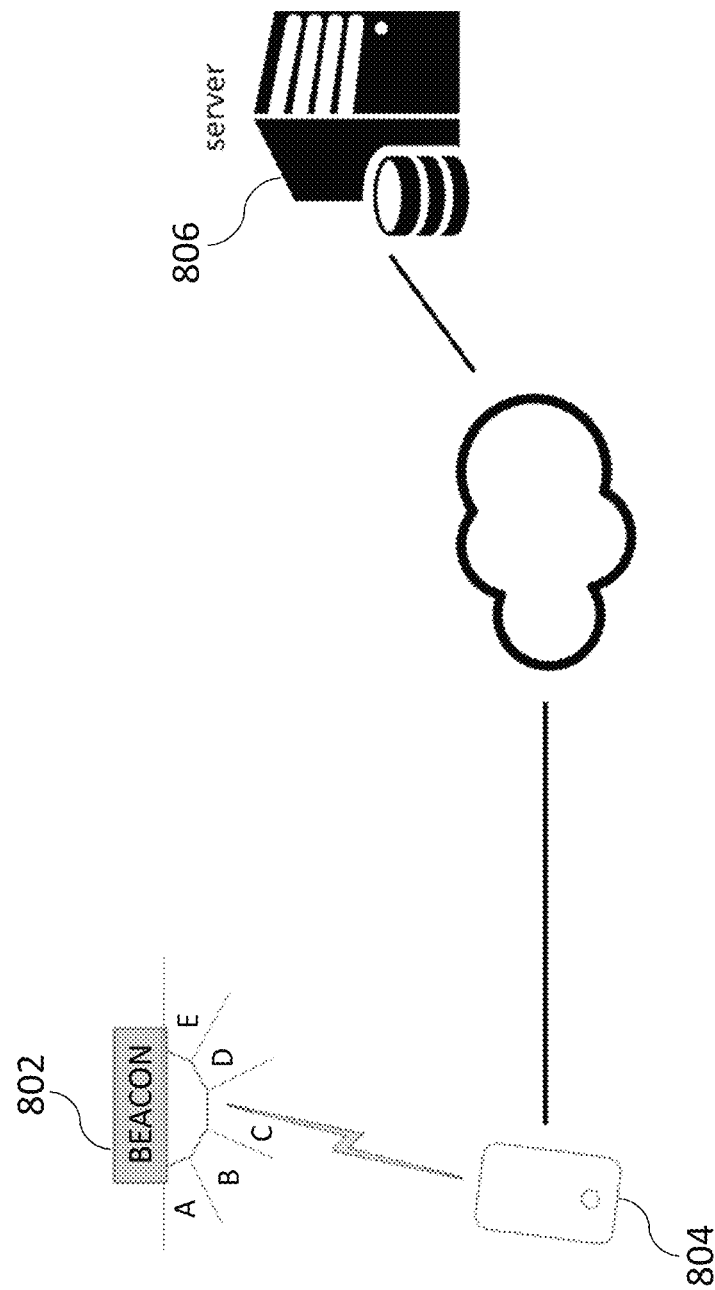
FIG. 8 is a schematic illustration of another embodiment of a system for automated determination of a pointing orientation of a mobile device, according to an embodiment.

FIG. 8 is a schematic illustration of another embodiment of a system for automated determination of a pointing orientation of a mobile device. Directional beacon 802 transmits directional beams in sectors A-E. Mobile device 804, which may be similar to mobile device 100 described above with reference to FIG. 1, may determine a location and/or pointing orientation of itself with respect to directional beacon 802 and/or another point of interest, as described above. Upon determining a particular location and/or pointing orientation, mobile device 804 may connect to another device in a peer-to-peer manner, e.g., for the purpose of sharing content, such as images, videos, text documents, or any other type of data. In other embodiments, the advertisement transmitted by directional beacon 802, e.g., such as advertisement 700 in FIG. 7, may comprise URL information directing mobile device 804 to a cloud server 806. Mobile device 804 may then transmit its location and orientation information to the cloud serve 806. Based on this information, cloud server 806 may provide mobile device 804 with relevant information regarding the point of interest.

Figure 9:
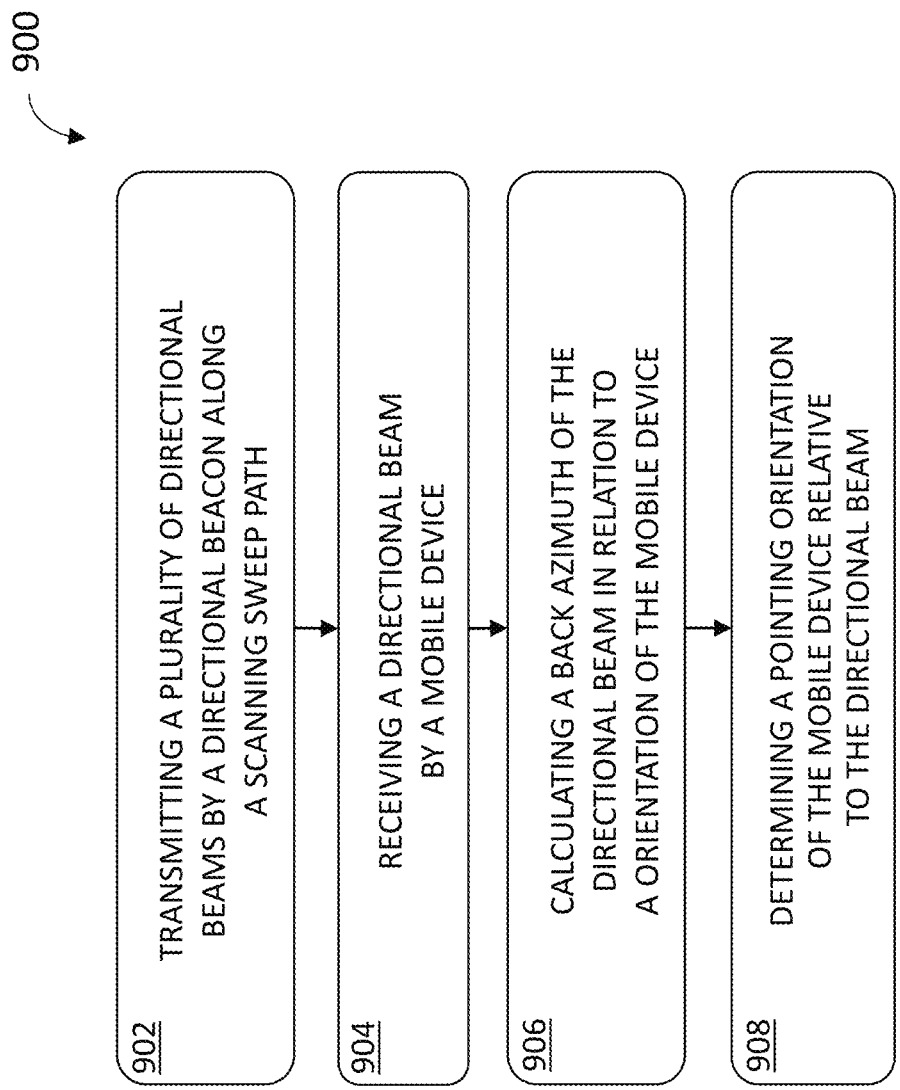
FIG. 9 is a flowchart of a method for automated determination of a pointing orientation of a of a mobile device, according to an embodiment.

FIG. 9 is a flowchart of a method 900 for automated determination of a pointing orientation of a mobile device, based on a determination of an orientation of the mobile device in relation to a directional beacon device. At 902, a directional beacon transmits directional beams along a sweep path. Each beam comprises at least an identifier for the directional beam, and information regarding the direction and the azimuth sector of the beam relative to a reference direction (e.g., the magnetic north).

At 904, a directional beam is received by a mobile device. At 906, the mobile device calculates a back-azimuth of the directional beam, in relation to the direction of the mobile device. At 908, the client device determines a pointing orientation of itself in relation to directional beam, when the calculated back-azimuth is within a specified range of the direction of the mobile device.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one transmitting device configured to transmit, in at least one plane, a plurality of directional signals each covering an angular sector, wherein each adjacent pair of said angular sectors overlaps partially to create a logical sector, and wherein each of said plurality of directional signals encodes at least an indication regarding each of said logical sectors associated therewith; and
   a client device comprising at least one hardware processor and a non-transitory computer-readable storage medium having stored thereon program instructions, the program instructions executable by the at least one hardware processor to:
   cause the client device to receive at least some of said plurality of directional signals,
   calculate a signal strength level (RSL) value for each of said received directional signals, and
   determine that said client device is located;
   (a) within one of said logical sectors, when the two highest said RSL values (i) are related to two of said directional signals associated with said logical sector, and (ii) are within a specified value range of each other, and
   (b) at a midpoint between said one of said logical sectors and a first said angular sector of a said adjacent pair creating said logical sector, when one of said two highest said RSL values corresponding to a second said angular sector of said adjacent pair corresponds to a location of said client device outside said second angular sector.

2. The system of claim 1, wherein said at least one plane comprises one or more of a horizontal plane and a vertical plane.

3. The system of claim 1, wherein said client device is further configured to calculate a location of said client device based, at least in part, on (i) said determination, and (ii) a calculation of a distance from said transmitting device based on said two highest said RSL values.

4. The system of claim 1, comprising two or more of said transmitting devices, wherein said determination comprises determining that said client device is located within at least two intersecting said logical sectors, wherein each of said intersecting logical sectors is transmitted by a different one of said transmitting devices.

5. The system of claim 4, wherein said client device is further configured to calculate a location of said client device based, at least in part, on (i) said determination, and (ii) a calculation of a distance from each of said transmitting devices, based on said two highest RSL values associated with each of said transmitting device.

6. The system of claim 1, wherein each of said directional signals further encodes information selected from the group consisting of: identification of said transmitting device, identification of said directional signal, azimuthal direction data regarding said angular sector of said directional signal relative to a reference azimuth, a Uniform Resource Locator (URL); and information regarding one or more of: a location, an altitude, a velocity, an acceleration, and a spatial orientation of said transmitting device.

7. The system of claim 6, wherein said client device is further configured to determine a pointing orientation of said client device relative to said transmitting device, by:
calculating, by said client device, a back-azimuth of said client device relative to said reference azimuth; and
determining, by said client device, whether said back-azimuth of said client device is within any of (i) said angular sectors or (ii) said logical sectors.

8. A method comprising:
operating a client device comprising at least one hardware processor and a non-transitory computer-readable storage medium having stored thereon program instructions, the program instructions executable by the at least one hardware processor to:
cause the client device to receive at least some of a plurality of directional signals transmitted by at least one transmitting device configured to transmit, in at least one plane, said plurality of directional signals, each covering an angular sector, wherein each adjacent pair of said angular sectors overlaps partially to create a logical sector, and wherein each of said plurality of directional signals encodes at least an indication regarding each of said logical sectors associated therewith,
calculate a signal strength level (RSL) value for each of said received directional signals, and
determine that said client device is located:
(a) within one of said logical sectors, when the two highest said RSL values (i) are related to two of said directional signals associated with said logical sector, and (ii) are within a specified value range of each other, and
(b) at a midpoint between said one of said logical sectors and a first said angular sector of a said adjacent pair creating said logical sector, when one of said two highest said RSL values corresponding to a second said angular sector of said adjacent pair corresponds to a location of said client device outside said second angular sector.

9. The method of claim 8, wherein said program instructions further cause the client device to calculate a location of said client device based, at least in part, on (i) said determination, and (ii) a calculation of a distance from said transmitting device based on said two highest said RSL values.

10. The method of claim 8, wherein said receiving comprises receiving a plurality of directional signals transmitted by two or more of said transmitting devices, and wherein said determining comprises determining that said client device is located within at least two intersecting logical sectors, wherein each of said intersecting logical sectors is transmitted by a different one of said transmitting devices.

11. The method of claim 10, wherein said program instructions further cause the client device to calculate a location of said client device based, at least in part, on (i) said determination, and (ii) a calculation of a distance from each of said transmitting devices, based on said two highest RSL values associated with each of said transmitting device.

12. The method of claim 8, wherein said program instructions further cause the client device to determine a pointing orientation of said client device relative to said transmitting device, by:
calculating, by said client device, a back-azimuth of said client device relative to said reference azimuth; and
determining, by said client device, based on information encoded in each of said directional signals, whether said back-azimuth of said client device is within any of (i) said angular sectors or (ii) said logical sectors.

13. A computer program product comprising a non-transitory computer-readable storage medium having program code embodied therewith, wherein the program code, when executed by a client device comprising at least one hardware processor, causes the client device to:
receive at least some of a plurality of directional signals transmitted by at least one transmitting device configured to transmit, in at least one plane, said plurality of directional signals, each covering an angular sector, wherein each adjacent pair of said angular sectors overlaps partially to create a logical sector, and wherein each of said plurality of directional signals encodes at least an indication regarding each of said logical sectors associated therewith;
calculate a signal strength level (RSL) value for each of said received directional signals; and
determine that said client device is located;
(a) within one of said logical sectors, when two highest said RSL values (i) are related to two of said directional signals associated with said logical sector, and (ii) are within a specified value range of each other, and
(b) at a midpoint between said one of said logical sectors and a first said angular sector of a said adjacent pair creating said logical sector, when one of said two highest said RSL values corresponding to a second said angular sector of said adjacent pair corresponds to a location of said client device outside said second angular sector.

14. The computer program product of claim 13, wherein said program code further causes the client device to calculate a location of said client device based, at least in part, on (i) said determination, and (ii) a calculation of a distance from said transmitting device based on said two highest said RSL values.

15. The computer program product of claim 13, wherein said receiving comprises receiving a plurality of directional signals transmitted by two or more of said transmitting devices, and wherein said determining comprises determining that said client device is located within at least two intersecting logical sectors, wherein each of said intersecting logical sectors is transmitted by a different one of said transmitting devices.

16. The computer program product of claim 15, wherein said program code further causes the client device to calculate a location of said client device based, at least in part, on (i) said determination, and (ii) a calculation of a distance from each of said transmitting devices, based on said two highest said RSL values associated with each of said transmitting device.

17. The computer program product of claim 13, wherein said program code further causes the client device to determine a pointing orientation of said client device relative to said transmitting device, by:
   calculating, by said client device, a back-azimuth of said client device relative to said reference azimuth; and
   determining, by said client device, based on information encoded in each of said directional signals, whether said back-azimuth of said client device is within any of (i) said azimuth sectors or (ii) said logical sectors.

\* \* \* \* \*